US012257844B2

(12) United States Patent
Kusano et al.

(10) Patent No.: US 12,257,844 B2
(45) Date of Patent: Mar. 25, 2025

(54) LIQUID STORAGE CONTAINER

(71) Applicant: CANON KABUSHIKI KAISHA, Tokyo (JP)

(72) Inventors: Hiroaki Kusano, Tokyo (JP); Junichiro Iri, Kanagawa (JP); Yusuke Hashimoto, Kanagawa (JP); Tomohisa Atsuta, Tokyo (JP); Masatomo Ojima, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 18/301,901

(22) Filed: Apr. 17, 2023

(65) Prior Publication Data

US 2023/0364917 A1 Nov. 16, 2023

(30) Foreign Application Priority Data

May 12, 2022 (JP) ................................ 2022-078966

(51) Int. Cl.
*B41J 2/175* (2006.01)

(52) U.S. Cl.
CPC ....... *B41J 2/17513* (2013.01); *B41J 2/17556* (2013.01); *B41J 2/1754* (2013.01)

(58) Field of Classification Search
CPC .... B41J 2/175; B41J 2/17503; B41J 2/17506; B41J 2/17509; B41J 2/17513; B41J 2/1752; B41J 2/1754; B41J 2/17553; B41J 2/1756; B41J 2/17559
See application file for complete search history.

(56) References Cited

U.S. PATENT DOCUMENTS 6,206,514 B1 * 3/2001 Tajima ................. B41J 2/17556 347/86
6,474,798 B1 * 11/2002 Shinada ................... B41J 2/305 347/86
2006/0221154 A1 * 10/2006 Takatsuka ............ B41J 2/17559 347/86
2011/0211028 A1 * 9/2011 Tsukamoto .......... B41J 2/17513 29/890.1

FOREIGN PATENT DOCUMENTS

JP 2009248426 A 10/2009

* cited by examiner

*Primary Examiner* — Anh T Vo
(74) *Attorney, Agent, or Firm* — Canon U.S.A., Inc. IP Divsion

(57) ABSTRACT

A liquid storage container includes a liquid absorber to absorb and hold a liquid, a storage portion storing the liquid absorber, a lid member having ribs, an air communication port provided in the lid member, and a liquid holding path. The storage portion has an opening facing a first surface of the liquid absorber and to be covered by the lid member. The ribs are in contact with the first surface when the lid member covers the opening. The air communication port communicates air to an internal space of the storage portion. The liquid holding path is provided on a rib adjacent to the air communication port and extends toward the lid member from a contact surface of the adjacent rib. The liquid holding path holds a liquid that has oozed from the first surface of the liquid absorber.

20 Claims, 9 Drawing Sheets

181
180
184A
185
170a
200
184a
170
LID FACING UPWARD
CHANGE IN POSTURE 185
180
200
LID FACING SIDEWAYS
CHANGE IN POSTURE 200
185
180a
180
LID FACING DOWNWARD
CHANGE IN POSTURE 180
200
185
LID FACING SIDEWAYS

LIQUID STORAGE CONTAINER

BACKGROUND

Field

The present disclosure relates to a liquid storage container capable of storing a liquid such as ink.

Description of the Related Art

There exists a conventional ink tank detachably attached to an ink jet printing apparatus. The ink tank includes a tank case that accommodates an ink absorber capable of holding ink, and a lid member that covers the opening portion of the tank case. A projection portion having a truncated cone shape and a plurality of ribs are provided on the inner surface of the lid member. The projection portion is provided with an air communication port communicating with the air. In a state where the opening portion of the tank case is covered by the lid member, the ribs are in contact with the ink absorber. A first groove and a second groove are also formed on the inner surface of the lid member. The first groove is away from the projection portion and surrounds the projection portion. The second groove is in an area surrounded by the first groove, is branched from the first groove, and is away from the projection portion. Japanese Patent Application Laid-Open No. 2009-248426 discusses an ink tank detachably attached to an ink jet printing apparatus.

The above ink tank that includes the tank case is often handled separately in a distribution process. While being transported, the ink tank changes its posture, and ink oozes from the ink absorber and reaches the inner surface of the lid member via the ribs or the like. The first and second grooves located near the projection portion hold the ink that has reached the inner surface of the lid member, thereby preventing the ink from entering the air communication port.

Recent years have seen an increase in the amount of ink injected into an ink tank. Some ink tanks can prevent the ink from entering the air communication port. However, with the recent increase in the amount of injected ink, further countermeasures have been demanded.

SUMMARY

The present disclosure is directed to a liquid storage container capable of preventing, even when the injected amount of liquid such as ink increases, the liquid from leaking to the outside from an air communication port.

According to an aspect of the present disclosure, a liquid storage container includes a liquid absorber configured to absorb and hold a liquid, a storage portion storing the liquid absorber, and having an opening portion facing a first surface of the liquid absorber, a lid member configured to cover the opening portion of the storage portion, a plurality of ribs provided on an inner surface of the lid member that is located closer to the storage portion, wherein the plurality of ribs is in contact with the first surface of the liquid absorber in a state where the opening portion is covered by the lid member, an air communication port provided in the lid member so that an internal space of the storage portion communicates with air, and at least one first liquid holding path provided on at least one rib adjacent to the air communication port among the plurality of ribs, and extending toward the lid member from a contact surface of the at least one rib that is in contact with the first surface, wherein the at least one first liquid holding path is configured to hold a liquid that has oozed from the first surface of the liquid absorber.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings. Components described in the exemplary embodiments are merely examples, and the scope of the present disclosure is not limited thereto.

Figure 1:
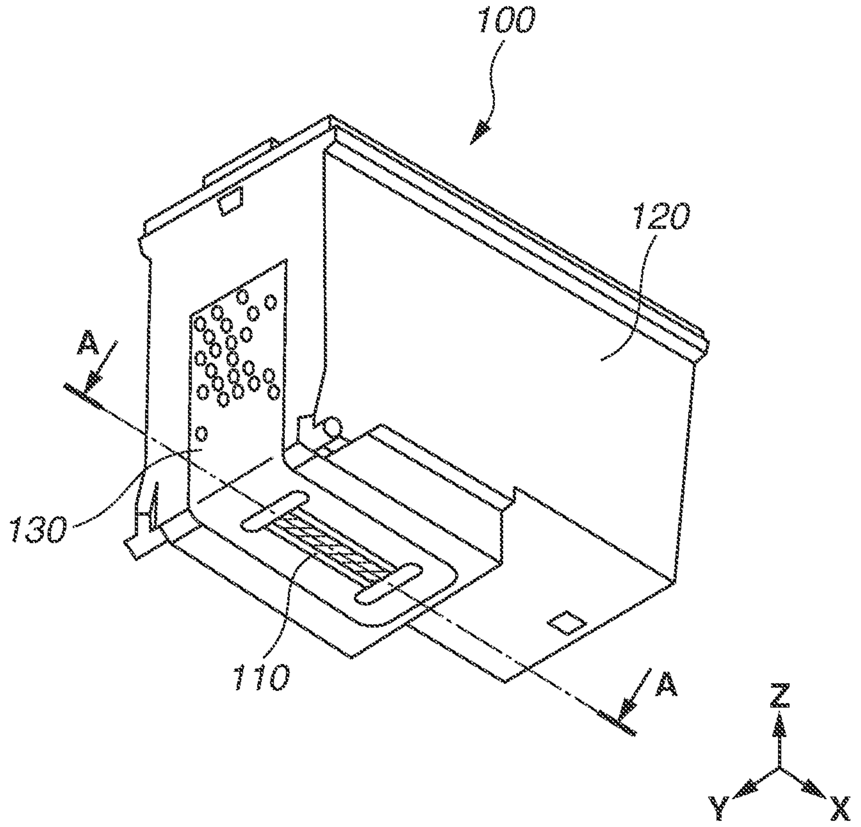
FIG. 1 is a perspective view illustrating an outer appearance of a liquid storage container according to a first exemplary embodiment of the present disclosure.

FIG. 1 is a perspective view illustrating an outer appearance of a liquid storage container 100 according to a first exemplary embodiment of the present disclosure. The liquid storage container 100 is a cartridge type container (an ink jet cartridge) integrated with a print head. As illustrated in FIG. 1, the liquid storage container 100 includes a housing 120 provided with a print head portion 110. The print head portion 110 includes a print element substrate 150 (see FIG. 2A) provided with a plurality of print elements that ejects a liquid such as ink. Each of the print elements is, for example, an electrothermal conversion element including a heat generating resistor and is capable of heating a liquid and ejecting liquid droplets by the action of film boiling.

While the liquid storage container 100 illustrated in FIG. 1 is for a single color, the present exemplary embodiment is not limited thereto. The present exemplary embodiment is also applicable to a liquid storage container that contains liquids of a plurality of colors (e.g., a three-color cartridge). The present exemplary embodiment is also applicable to a liquid storage container that does not include the print head portion 110.

Figure 2A:
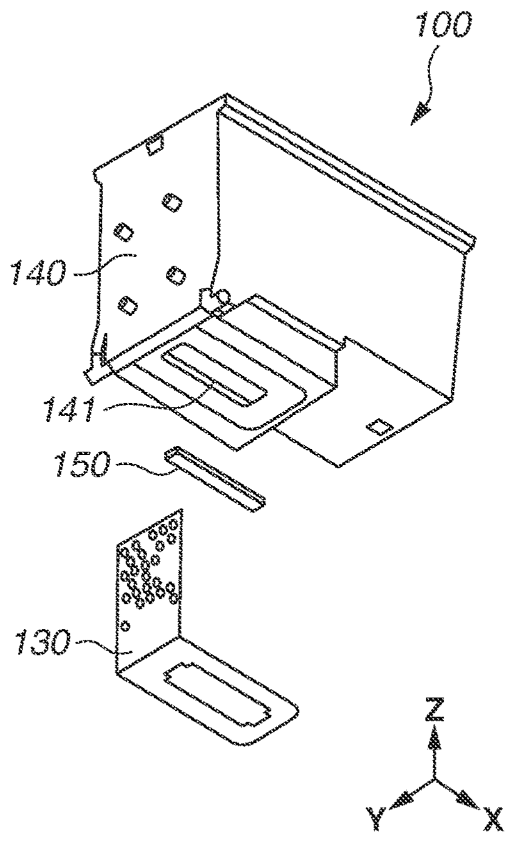
FIGS. 2A and 2B are exploded perspective views respectively illustrating a print head portion and a tank portion of the liquid storage container illustrated in FIG. 1.
Figure 2B:
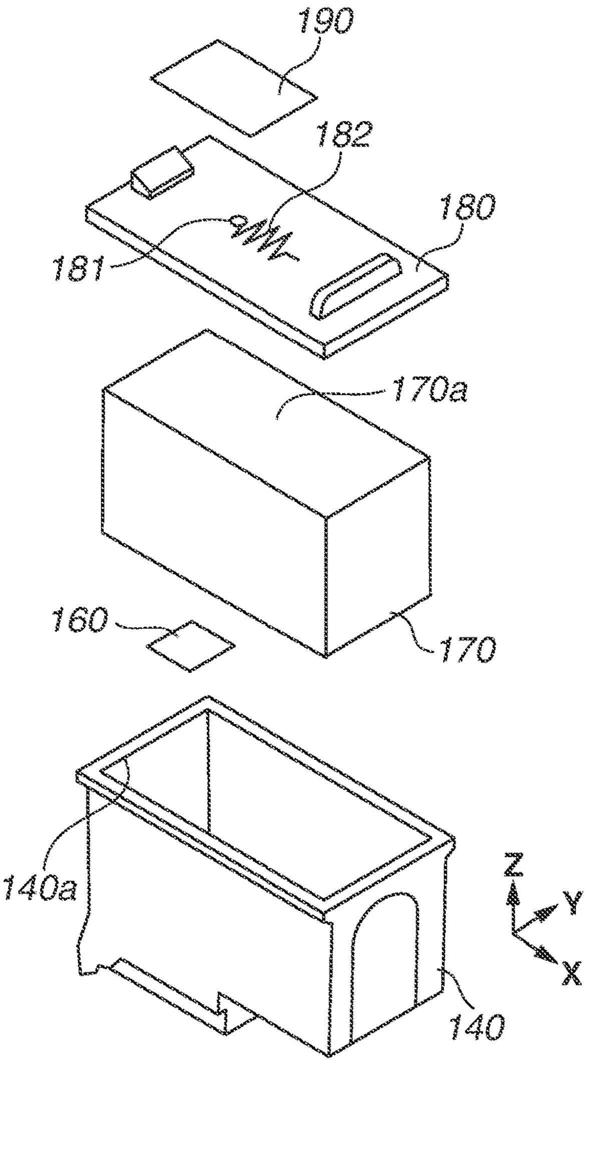

FIGS. 2A and 2B are exploded perspective views of the liquid storage container 100 illustrated in FIG. 1. FIG. 2A is a partially exploded perspective view of the print head portion 110, and FIG. 2B is an exploded perspective view of a tank portion of the housing 120. As illustrated in FIG. 2A, a recessed portion for attaching the print element substrate 150 is provided on the bottom surface of a storage portion 140, and a liquid channel 141 is provided at the center of the recessed portion. The print element substrate 150 is attached to the recessed portion of the storage portion 140 and is electrically connected to an electric wiring substrate 130 that supplies a driving signal and the like from a printing apparatus main body.

As illustrated in FIG. 2B, the storage portion 140 stores a liquid absorber 170 capable of absorbing and holding a liquid by capillary action. The storage portion 140 includes an opening portion 140*a* facing a first surface 170*a* of the liquid absorber 170. The liquid absorber 170 is made of, for example, absorbent fiber. A lid member 180 covers the opening portion 140*a* of the storage portion 140. The lid member 180 covering the opening portion 140*a* faces the first surface 170*a* of the liquid absorber 170. The lid member 180 has an air communication port 181 that allows an internal space 186 (see FIG. 3) of the storage portion 140 to communicate with the air. A groove 182 is formed on the top surface of the lid member 180, and a sheet member 190 is provided on the groove 182.

Figure 3:
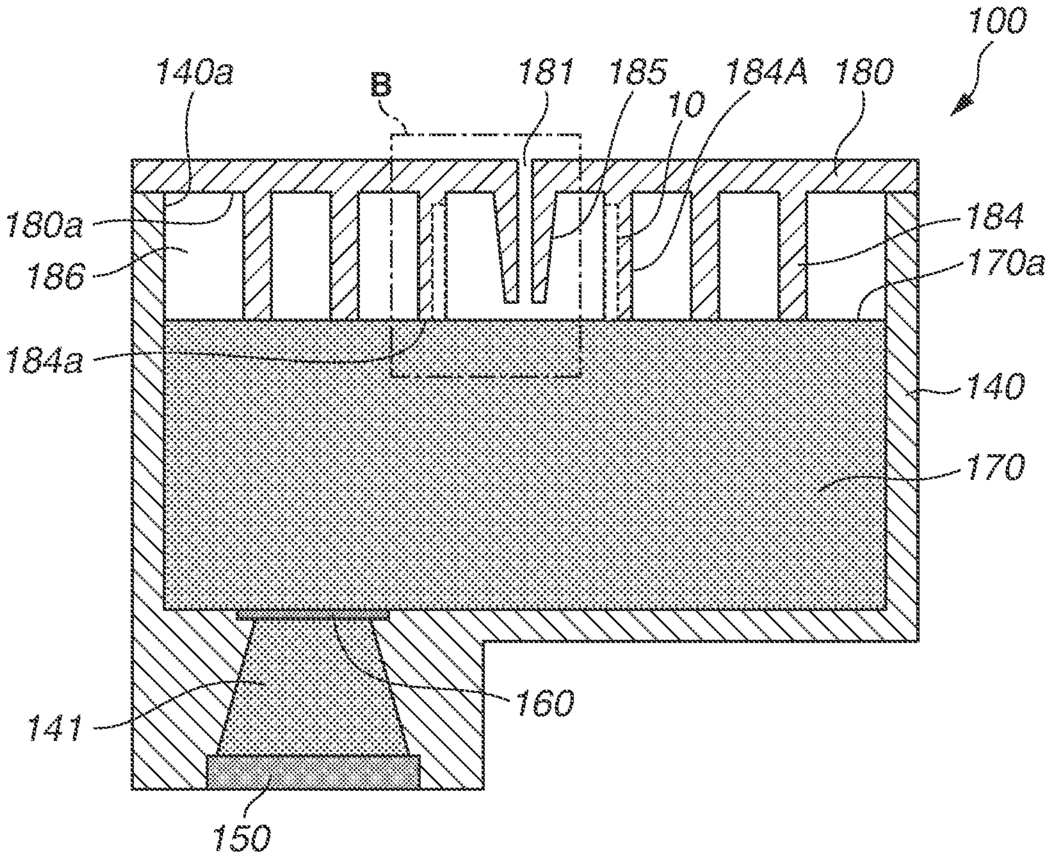
FIG. 3 is a sectional view partially illustrating a cross-section of the liquid storage container taken along a line A-A in FIG. 1.

FIG. 3 is a sectional view partially illustrating a cross-section of the liquid storage container 100 taken along a line A-A in FIG. 1. One end of the liquid channel 141 is open to the inner surface (the bottom surface) of the internal space 186 of the storage portion 140, and a filter 160 is disposed on this opening. The bottom surface (the surface opposite to the first surface 170*a*) of the liquid absorber 170 is in close contact with the filter 160, and the liquid held in the liquid absorber 170 is supplied to the liquid channel 141 via the filter 160. The liquid channel 141 communicates with the print elements of the print element substrate 150.

A plurality of ribs 184 is provided on an inner surface 180*a* of the lid member 180 on the storage portion 140 side. Each of the ribs 184 has a plate shape and is attached to the inner surface 180*a* of the lid member 180 at a right angle. In a state where the opening portion 140*a* of the storage portion 140 is covered by the lid member 180, the ribs 184 are in contact with the first surface 170*a* of the liquid absorber 170. More specifically, each of the ribs 184 has a contact surface 184*a* that is in contact with the first surface 170*a*. The liquid absorber 170 is pressed toward the bottom surface of the storage portion 140 (e.g., toward the filter 160) by the ribs 184 and is stored in the internal space 186 of the storage portion 140. It is desirable that the ribs 184 be made of resin (e.g., engineering plastic). The ribs 184 can have a shape other than a plate shape.

A projection portion 185 is provided on the inner surface 180*a* of the lid member 180. The projection portion 185 has, for example, a truncated cone shape, but is not limited thereto. The projection portion 185 is provided with the air communication port 181 that communicates with the air. The air communication port 181 is a through-hole penetrating the lid member 180. The internal space 186 communicates with the air communication port 181.

In a state where the opening portion 140*a* of the storage portion 140 is covered by the lid member 180, the projection portion 185 is not in contact with the first surface 170*a* of the liquid absorber 170. The projection portion 185 is provided at the central portion of the inner surface 180*a* of the lid member 180. The ribs 184 are disposed on both sides of the projection portion 185.

The projection portion 185 can be provided at a portion other than the central portion of the inner surface 180*a* of the lid member 180.

At least one first liquid holding path 10 is provided on at least each of ribs 184A adjacent to the projection portion 185 (the air communication port 181) among the plurality of ribs 184. The first liquid holding path 10 extends from the contact surface 184*a* of the corresponding rib 184A toward the lid member 180. The first liquid holding path 10 is formed to hold a liquid 200 (see FIG. 6A) that has oozed from the first surface 170*a* of the liquid absorber 170. The structure of the first liquid holding path 10 is an example of a capillary structure that absorbs the liquid 200 that has oozed from the first surface 170*a* by capillary action.

The first liquid holding path 10 will be described in detail next.

Figure 4A:
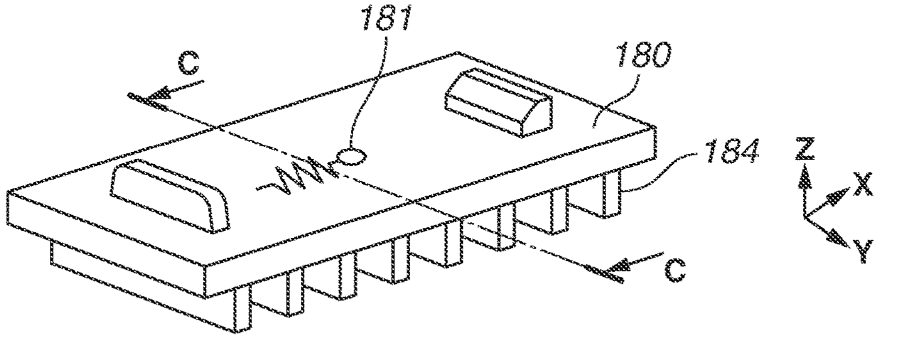
FIGS. 4A to 4D are schematic views illustrating an example of ribs of a lid member.
Figure 4B:
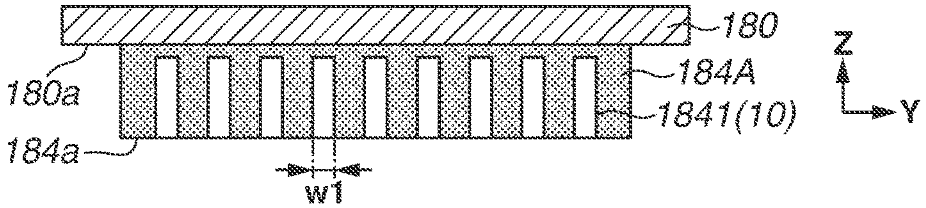
Figure 4C:
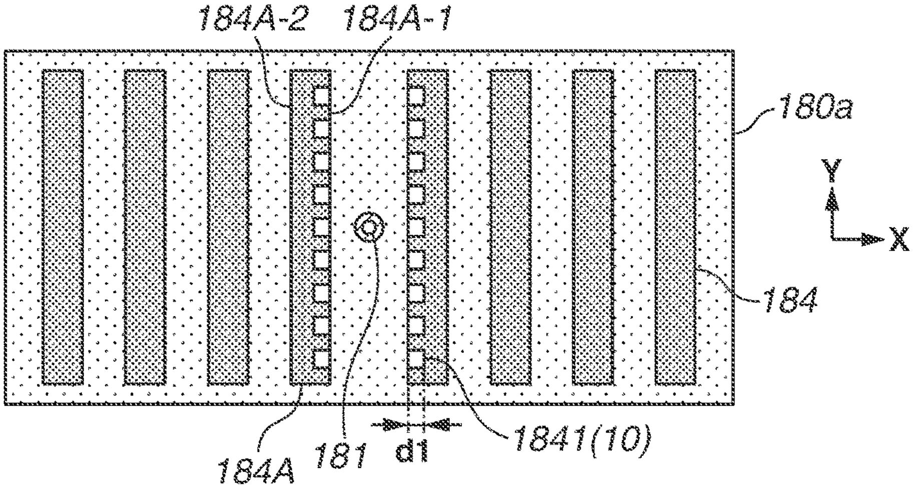
Figure 4D:
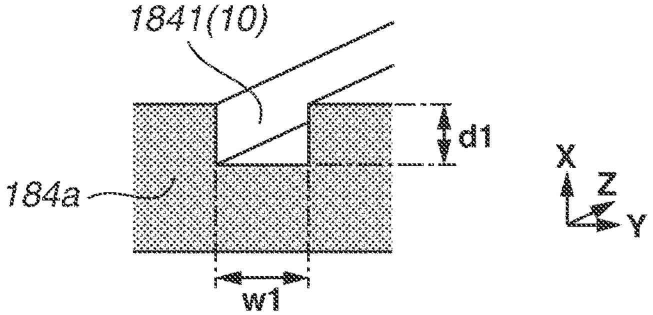

FIGS. 4A to 4D schematically illustrate an example of the ribs 184 of the lid member 180. FIG. 4A is a perspective view illustrating an outer appearance of the lid member 180. FIG. 4B is a sectional view schematically illustrating a cross-section of the lid member 180 taken along a line C-C in FIG. 4A. FIG. 4C is a schematic plan view illustrating a state of the lid member 180 viewed from the inner surface 180*a* side. FIG. 4D is a partial enlarged view of each rib 184A.

As illustrated in FIGS. 4A to 4C, a plurality of groove-like channels 1841 serving as the first liquid holding path 10 is provided on a side surface of each of the two ribs 184A disposed on both sides of the air communication port 181. The groove-like channels 1841 are arranged side by side in parallel with each other. In FIGS. 4B to 4D, the groove-like channels 1841 are also denoted by the reference numeral 10, which indicates the first liquid holding path 10. As illustrated in FIG. 4D, each of the groove-like channels 1841 has a dead end in a depth direction (an X direction) and has a rectangular cross section. The groove-like channels 1841 can be formed when the lid member 180 is molded with resin. Each of the groove-like channels 1841 extends in a direction (a Z direction) parallel to the short side of the corresponding rib 184A. Each of the groove-like channels 1841 has a width w1 and a depth d1.

The width w1 is the length in a direction perpendicular to the extending direction of the groove-like channel 1841 and parallel to the side surface of the corresponding rib 184A. The depth d1 is the length in a direction perpendicular to the extending direction of the groove-like channel 1841 and perpendicular to the side surface of the corresponding rib 184A.

As illustrated in FIG. 4C, each rib 184A has a first side surface 184A-1 located on a side closer to the air communication port 181, and a second side surface 184A-2 located on the opposite side of the first side surface 184A-1. In the present exemplary embodiment, the groove-like channels 1841 are provided on the first side surface 184A-1 of each rib 184A. One end of each of the groove-like channels 1841 is open to the contact surface 184*a* of the corresponding rib 184A.

The groove-like channels 1841 are formed to hold the liquid 200 that has oozed from the first surface 170*a* of the liquid absorber 170. When ink, which is widely used in ink jet printing apparatuses, is used as a liquid, the viscosity of the ink is, for example, 1.0 to 3.0 [mPa·s], and the surface tension is, for example, 30 to 40 [mN/m]. Each of the groove-like channels 1841 is formed so that capillary action is to be generated with respect to the ink. Each of the groove-like channels 1841 has the width w1 ranging from 0.2 to 1.0 mm, and the depth d1 ranging from 0.2 to 1.0 mm. To hold the ink and to effectively generate a capillary force (a force for generating capillary action) on the held ink, it is desirable that the relationship between the width w1 and the depth d1 of each of the groove-like channels 1841 satisfy a condition of $w1>d1$.

Next, operational effects of the liquid storage container 100 according to the present exemplary embodiment will be described. The operational effects will be described in comparison with a liquid storage container according to a comparative example that does not have the groove-like channels 1841.

The liquid storage container according to the comparative example has the same structure as that of the liquid storage container 100 according to the present exemplary embodiment, except that the liquid storage container does not have the groove-like channels 1841. When the posture of the liquid storage container changes, the liquid 200 that has oozed from the first surface 170*a* of the liquid absorber 170 moves inside the liquid storage container.

Figures 5A, 5B, 5C, 5D:
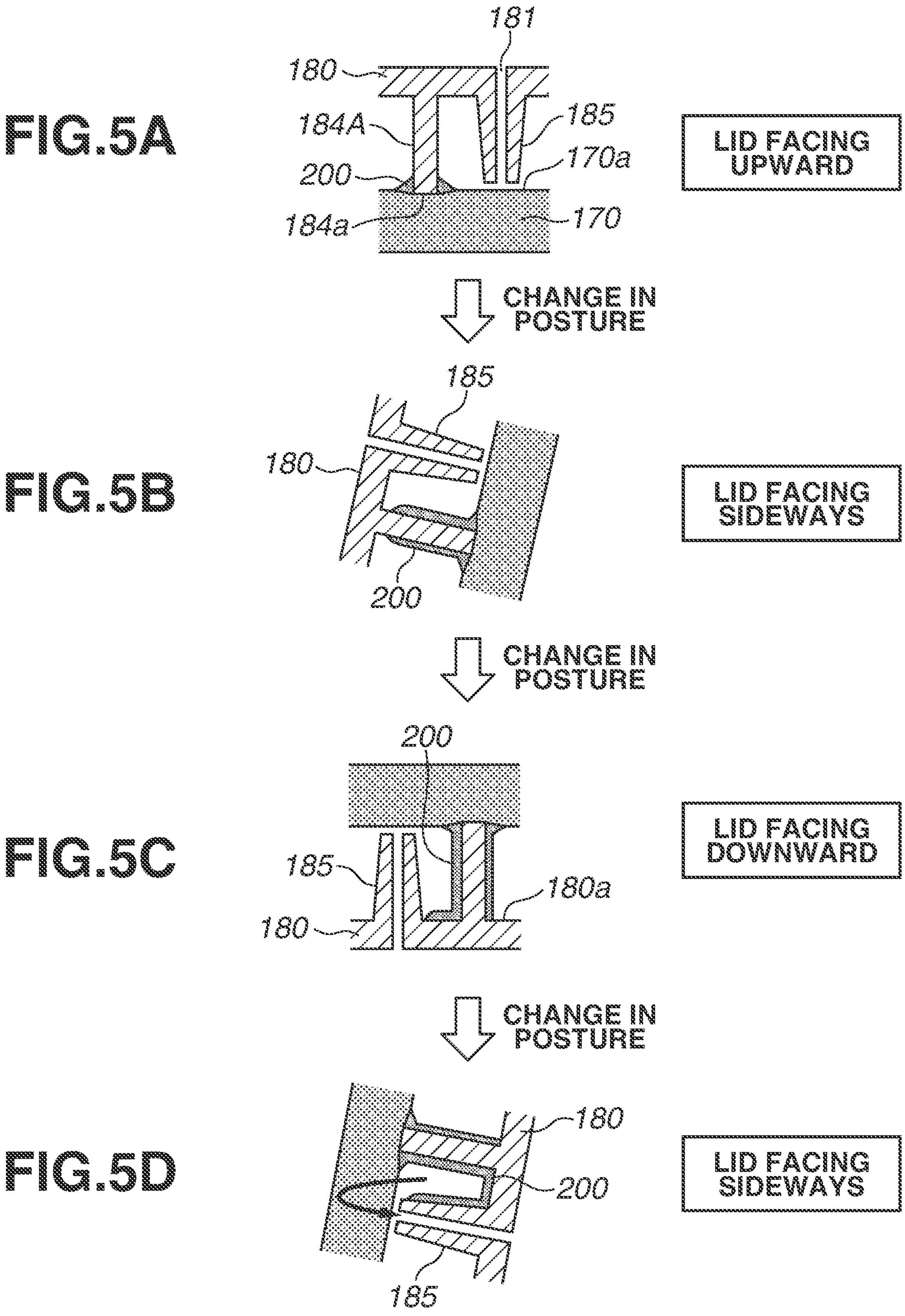
FIGS. 5A to 5D are schematic views illustrating states of a liquid near an air communication port in a case where a liquid storage container according to a comparative example is rotated once.

FIGS. 5A to 5D schematically illustrate states in which the liquid near the air communication port 181 moves inside the liquid storage container according to the comparative example when the liquid storage container is rotated once. FIGS. 5A to 5D each illustrate a portion (without the groove-like channels 1841 (the first liquid holding path 10)) corresponding to a portion of the liquid storage container 100 surrounded by a dashed-dotted line B in FIG. 3. FIG. 5A illustrates a state in which the lid member 180 faces upward. FIG. 5B illustrates a state in which the lid member 180 faces sideways. FIG. 5C illustrates a state in which the lid member 180 faces downward. FIG. 5D illustrates a state in which the lid member 180 faces sideways in a direction opposite to that in FIG. 5B.

In the liquid storage container, void portions of the liquid absorber 170 can expand when the pressure in the internal space 186 fluctuates, thereby decreasing the liquid holding force of the liquid absorber 170. In addition, the pressing force of the ribs 184 with respect to the liquid absorber 170 can increase due to dimensional variations that occur when the bonding portion between the lid member 180 and the opening portion 140*a* of the storage portion 140 is processed. As a result, in the state (in which the lid member 180 faces upward) illustrated in FIG. 5A, the liquid 200 oozes from the first surface 170*a* of the liquid absorber 170 near the contact surface 184*a* of the rib 184A.

When the posture of the liquid storage container changes from the state (in which the lid member 180 faces upward) illustrated in FIG. 5A to the state (in which the lid member 180 faces sideways) illustrated in FIG. 5B, the liquid 200 moves toward the lid member 180 on both side surfaces of the rib 184A.

When the posture of the liquid storage container further changes from the state (in which the lid member 180 faces sideways) illustrated in FIG. 5B to the state (in which the lid member 180 faces downward) illustrated in FIG. 5C, the liquid 200 moves along the side surfaces of the rib 184A and reaches the inner surface 180*a* of the lid member 180. Thereafter, the liquid 200 moves along the inner surface 180*a* and reaches the projection portion 185. When the posture of the liquid storage container further changes from the state (in which the lid member 180 faces downward) illustrated in FIG. 5C to the state (in which the lid member 180 faces sideways) illustrated in FIG. 5D, the liquid 200 moves along one of the side surfaces of the projection portion 185 toward the air communication port 181.

When the posture of the liquid storage container according to the comparative example is repeatedly changed as illustrated in FIGS. 5A to 5D, the liquid 200 leaks to the outside via the air communication port 181 as indicated by an arrow in FIG. 5D.

The following description will be given of how the liquid in the liquid storage container 100 according to the present exemplary embodiment moves as the posture of the liquid storage container 100 changes.

Figure 6A:
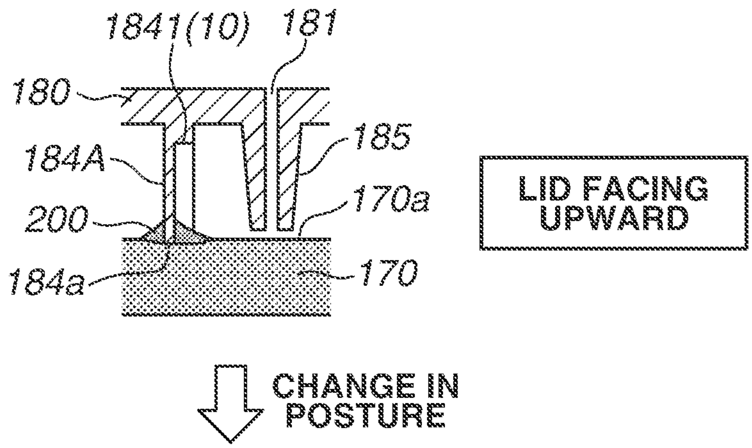
FIGS. 6A to 6D are schematic views illustrating states of a liquid near an air communication port in a case where the liquid storage container illustrated in FIG. 1 is rotated once.

FIGS. 6A to 6D schematically illustrate states of the liquid near the air communication port 181 in a case where the liquid storage container 100 is rotated once. As in FIGS. 5A to 5D, FIGS. 6A to 6D each illustrate a portion corresponding to the portion of the liquid storage container 100 surrounded by the dashed-dotted line B in FIG. 3. FIG. 6A illustrates a state in which the lid member 180 faces upward.

Figure 6B:
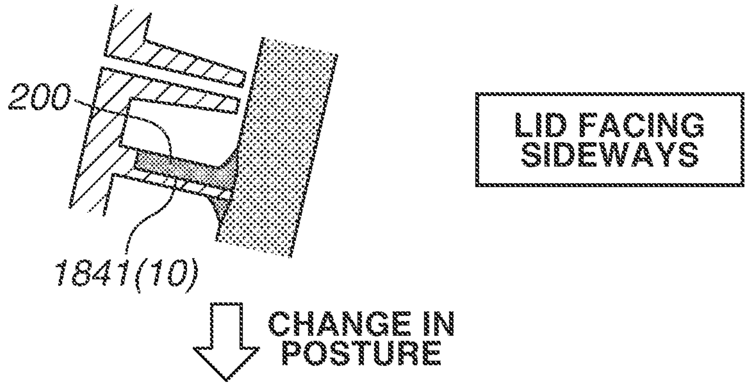
Figure 6C:
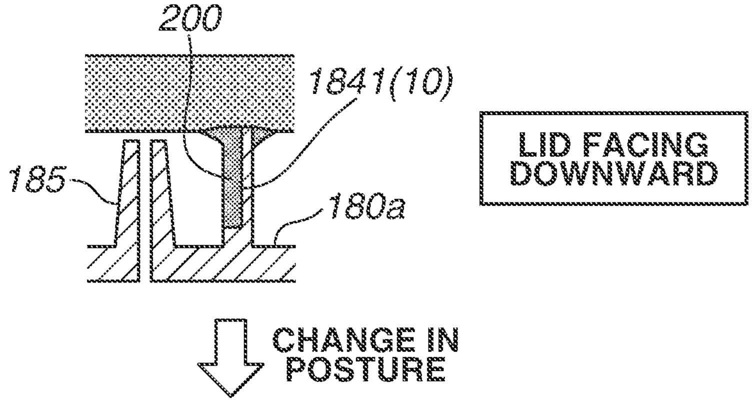
Figure 6D:
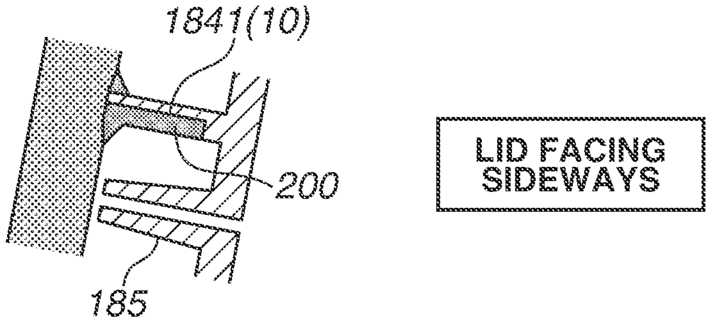

FIG. 6B illustrates a state in which the lid member 180 faces sideways. FIG. 6C illustrates a state in which the lid member 180 faces downward. FIG. 6D illustrates a state in which the lid member 180 faces sideways in a direction opposite to that in FIG. 6B.

In the liquid storage container 100, the groove-like channels 1841 (the first liquid holding path 10) provided on the first side surface 184A-1 of the rib 184A hold the liquid 200 that has oozed from the first surface 170*a* of the liquid absorber 170. Thus, even when the posture of the liquid storage container 100 changes as illustrated in FIGS. 6A to 6D, the liquid 200 is prevented from moving along the rib 184A and reaching the inner surface 180*a* of the lid member 180. As a result, the liquid 200 is prevented from leaking to the outside via the air communication port 181 even when the change in posture is repeated as illustrated in FIGS. 6A to 6D.

In the liquid storage container 100 according to the present exemplary embodiment, it is desirable that the first liquid holding path 10 (the groove-like channels 1841) be each formed so that a portion closer to the lid member 180 has a stronger capillary force. In this way, the liquid 200 that has oozed from the first surface 170*a* of the liquid absorber 170 can be reliably held by the whole of the first liquid holding path 10 (the groove-like channels 1841).

Main parameters relating to capillary action include the density of the liquid 200, the surface tension of the liquid 200, the contact angle of the liquid 200 with respect to a solid body (an inner surface of the first liquid holding path 10), and the width w1 of the first liquid holding path 10. The capillary force is inversely proportional to the width w1 of the first liquid holding path 10. Thus, in the first liquid holding path 10 (the groove-like channels 1841), a portion having a smaller width w1 has a stronger capillary force. Based on this principle, in the first liquid holding path 10 (the groove-like channels 1841), a portion closer to the lid member 180 is formed to have a smaller width w1 (while the depth d1 is maintained constant). In this way, the first liquid holding path 10 can be formed so that a portion closer to the lid member 180 has a stronger capillary force. In the structure in which a portion closer to the lid member 180 is formed to have a smaller width w1, it is desirable that each portion always satisfy the condition of $w1>d1$.

In another method, the capillary force can be changed by performing surface treatment and changing the wettability of the inner surface of the first liquid holding path 10 depending on the portion. The wettability indicates how easily the solid body (the inner surface of the first liquid holding path 10) becomes wet. As the contact angle of the liquid 200 decreases, the solid body (the inner surface of the first liquid holding path 10) becomes more wettable, thereby increasing the capillary force. Based on this principle, in the first liquid holding path 10 (the groove-like channels 1841), a portion closer to the lid member 180 is formed to have higher wettability. In this way, the first liquid holding path 10 can be formed so that a portion closer to the lid member 180 has a stronger capillary force. In this case, too, it is desirable that each portion always satisfy the condition of w1>d1.

In addition, it is desirable that the other end of each of the groove-like channels 1841 not reach the inner surface 180*a* of the lid member 180. In other words, it is desirable that the other end of each of the groove-like channels 1841 terminate between the inner surface 180*a* of the lid member 180 and the corresponding contact surface 184*a*. In this way, the liquid held in the groove-like channels 1841 is prevented from moving to the inner surface 180*a* of the lid member 180.

With the structure in which each rib 184A is provided with the first liquid holding path 10 (the groove-like channels 1841), the liquid storage container 100 can hold more liquid than a conventional ink tank. As a result, even when the amount of liquid injected into the liquid absorber 170 increases, the liquid can be prevented from leaking to the outside via the air communication port 181.

In the present exemplary embodiment, the groove-like channels 1841 are provided on the first side surface 184A-1 of each rib 184A, but can be formed on a surface other than the first side surface 184A-1.

The groove-like channels 1841 can be provided on both the first side surface 184A-1 and the second side surface 184A-2 of each rib 184A. In this way, more liquid can be held by the groove-like channels 1841, and a liquid leakage from the air communication port 181 can be prevented more reliably.

Further, while the ribs 184A adjacent to the projection portion 185 are provided with the groove-like channels 1841, the ribs 184 other than the ribs 184A can be provided with the groove-like channels 1841. In addition to the ribs 184A, the other ribs 184 can be provided with the groove-like channels 1841 as appropriate. In this way, a liquid leakage from the air communication port 181 can be prevented more reliably.

A liquid storage container according to a second exemplary embodiment of the present disclosure is the same as that according to the first example embodiment, except that the first liquid holding path 10 according to the second exemplary embodiment has a different structure.

Figure 7A:
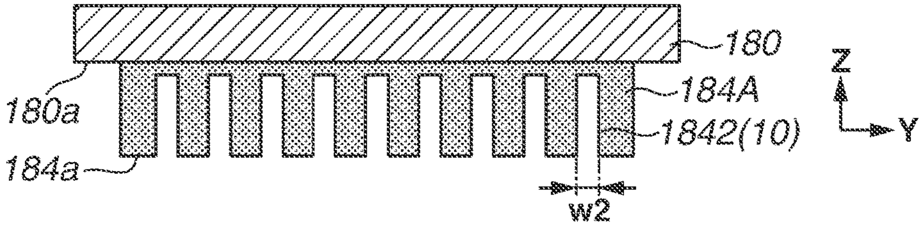
FIGS. 7A to 7C are schematic views illustrating an example of ribs of a lid member used in a liquid storage container according to a second exemplary embodiment of the present disclosure.
Figure 7B:
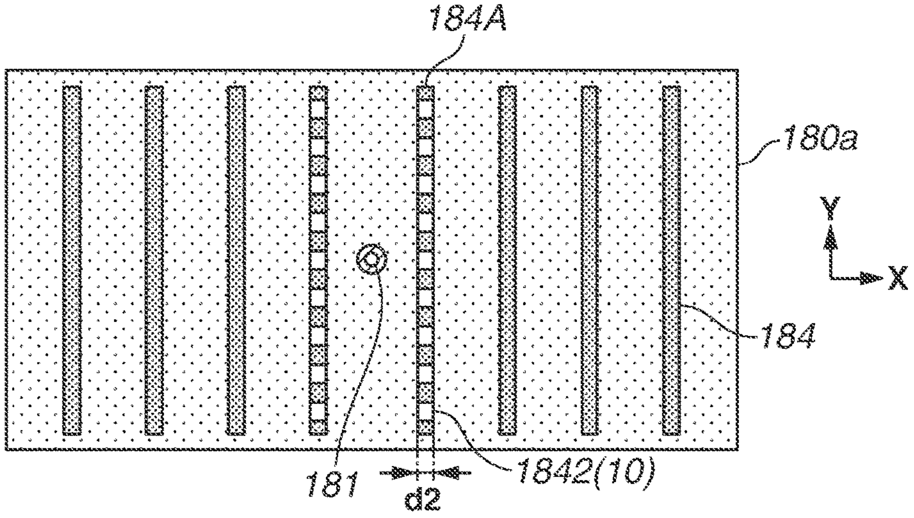
Figure 7C:
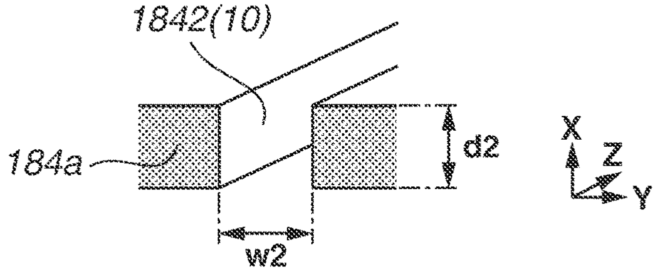

FIGS. 7A to 7C schematically illustrate an example of the ribs 184 of the lid member 180 used in the liquid storage container according to the present exemplary embodiment. FIG. 7A is a sectional view of the lid member 180 and illustrates a cross-section corresponding to FIG. 4B. FIG. 7B is a schematic plan view illustrating a state of the lid member 180 viewed from the inner surface 180*a* side and corresponds to FIG. 4C. FIG. 7C is a partial enlarged view of each rib 184A.

As illustrated in FIGS. 7A and 7B, a plurality of slit-like channels 1842 serving as the first liquid holding path 10 is provided in each of the two ribs 184A disposed on both sides of the air communication port 181. The slit-like channels 1842 are arranged side by side in parallel with each other. In FIGS. 7A to 7C, the slit-like channels 1842 are also denoted by the reference numeral 10, which indicates the first liquid holding path 10. As illustrated in FIG. 7C, each of the slit-like channels 1842 is a slit penetrating the corresponding rib 184A in a thickness direction (an X direction). The slit-like channels 1842 can be formed when the lid member 180 is molded with resin. Each of the slit-like channels 1842 extends from the contact surface 184*a* of the corresponding rib 184A toward the inner surface 180*a* of the lid member 180. One end of each of the slit-like channels 1842 is open to the contact surface 184*a* of the corresponding rib 184A. Each of the slit-like channels 1842 has a width w2 and a depth d2. The width w2 is the length in a direction perpendicular to the extending direction of the slit-like channel 1842 and parallel to the side surface of the corresponding rib 184A. The depth d2 is the length in a direction perpendicular to the extending direction of the slit-like channel 1842 and perpendicular to the side surface of the corresponding rib 184A.

The depth d2 is the same as the thickness of each rib 184A.

As is the case with the groove-like channels 1841, the slit-like channels 1842 are also capable of holding the liquid 200 that has oozed from the first surface 170*a* of the liquid absorber 170. It is desirable that each of the slit-like channels 1842 be shaped so that a capillary force acts on the held liquid, and that the width w2 be in the range of 0.2 to 1.0 mm. In order for the capillary force to act on the held liquid, it is desirable that the relationship between the width w2 and the depth d2 of each of the slit-like channels 1842 satisfy a condition of w2>d2. The depth d2 is the same as the thickness of each rib 184A.

Since the silt-like channels 1842 hold the liquid 200 that has oozed from the first surface 170*a* of the liquid absorber 170, the liquid storage container according to the present exemplary embodiment exhibits the operational effects similar to those according to the first exemplary embodiment.

The slit-like channels 1842 can hold more liquid than the groove-like channels 1841. Therefore, a liquid leakage from the air communication port 181 can be prevented more reliably.

In the liquid storage container according to the present exemplary embodiment, it is desirable that the slit-like channels 1842 be each formed so that a portion closer to the lid member 180 has a stronger capillary force. In this way, the liquid 200 that has oozed from the first surface 170*a* of the liquid absorber 170 can be reliably held by the whole of the slit-like channels 1842.

For example, in each of the slit-like channels 1842, a portion closer to the lid member 180 is formed to have a smaller width w2, or the wettability of a portion closer to the lid member 180 is increased by surface treatment. In this way, the slit-like channels 1842 can each be formed so that a portion closer to the lid member 180 has a stronger capillary force. In any case, it is desirable that each portion always satisfy the condition of w2>d2.

In addition, it is desirable that the other end of each of the slit-like channels 1842 not reach the inner surface 180*a* of the lid member 180. In other words, it is desirable that the other end of each of the slit-like channels 1842 terminate between the inner surface 180*a* of the lid member 180 and the corresponding contact surface 184*a*. In this way, the liquid held in the slit-like channels 1842 is prevented from moving to the inner surface 180*a* of the lid member 180.

In the present exemplary embodiment, the ribs 184A adjacent to the projection portion 185 are provided with the slit-like channels 1842, but the ribs 184 other than the ribs 184A can be provided with the slit-like channels 1842. In addition to the ribs 184A, the other ribs 184 can be provided with the slit-like channels 1842 as appropriate. In this way, a liquid leakage from the air communication port 181 can be prevented more reliably.

A liquid storage container according to a third exemplary embodiment of the present disclosure is the same as that according to the first exemplary embodiment, except that the liquid storage container includes, in addition to the first liquid holding path 10, at least one second liquid holding path 20 extending in a direction that crosses the first liquid holding path 10. The second liquid holding path 20 is provided on each rib 184A and communicates with the first liquid holding path 10. The second liquid holding path 20 is formed to hold the liquid flowing from the first liquid holding path 10. The structure of the second liquid holding path 20 is an example of a capillary structure that absorbs the liquid by capillary action.

Figure 8A:
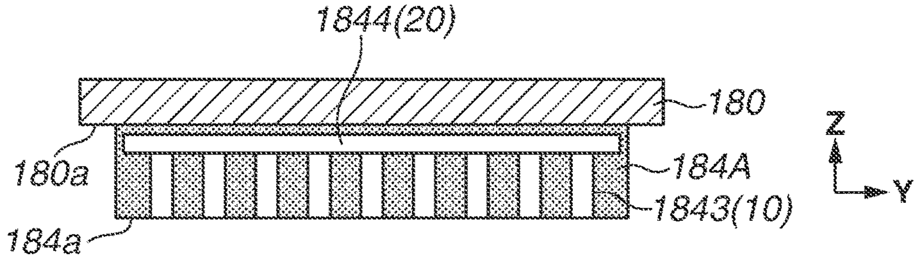
FIGS. 8A and 8B are schematic views illustrating an example of ribs of a lid member used in a liquid storage container according to a third exemplary embodiment of the present disclosure.
Figure 8B:
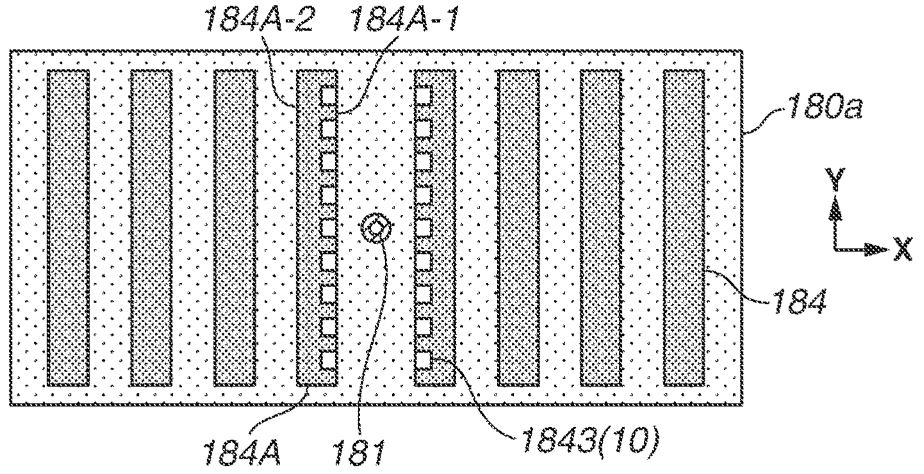

FIGS. 8A and 8B schematically illustrate an example of the ribs 184 of the lid member 180 used in the liquid storage container according to the present exemplary embodiment. FIG. 8A is a sectional view of the lid member 180 and illustrates a cross-section corresponding to FIG. 4B. FIG. 8B is a schematic plan view illustrating a state of the lid member 180 viewed from the inner surface 180*a* side and corresponds to FIG. 4C.

Referring to FIGS. 8A and 8B, a plurality of first groove-like channels 1843 is provided side by side on the two ribs 184A disposed on both sides of the air communication port 181, and serves as the first liquid holding paths 10. In FIGS. 8A and 8B, the first groove-like channels 1843 are also denoted by the reference numeral 10, which indicates the first liquid holding path 10. The first groove-like channels 1843 have the same structure as that of the groove-like channels 1841 illustrated in FIGS. 4B to 4D and are formed on the first side surface 184A-1 of each rib 184A. On the first side surface 184A-1 of each rib 184A, at least one second groove-like channel 1844 is further formed as the second liquid holding path 20. In FIGS. 8A and 8B, the second groove-like channel 1844 is also denoted by the reference numeral 20, which indicates the second liquid holding path 20. The second groove-like channel 1844 extends in a direction crossing (in the present exemplary embodiment, perpendicular to) the first groove-like channels 1843. In the present exemplary embodiment, the second groove-like channel 1844 is disposed closer to the lid member 180 than the first groove-like channels 1843. The second groove-like channel 1844 connects end portions of the first groove-like channels 1843. The second groove-like channel 1844 holds the liquid flowing from the first groove-like channels 1843. As is the case with the groove-like channels 1841, the first groove-like channels 1843 and the second groove-like channel 1844 can be formed when the lid member 180 is molded with resin.

Since the first groove-like channels 1843 (the first liquid holding path 10) and the second groove-like channel 1844 (the second liquid holding path 20) hold the liquid 200 that has oozed from the first surface 170*a* of the liquid absorber 170, the liquid storage container according to the present exemplary embodiment exhibits the operational effects similar to those according to the first exemplary embodiment.

In addition, the amount of liquid held by the first groove-like channels 1843 (the first liquid holding path 10) and the second groove-like channel 1844 (the second liquid holding path 20) is greater than the amount of liquid held by the groove-like channels 1841 (the first liquid holding path 10) according to the first exemplary embodiment. Thus, even when the amount of liquid 200 that has oozed from the first surface 170*a* of the liquid absorber 170 increases, the liquid 200 is reliably prevented from leaking to the outside from the air communication port 181.

In the liquid storage container according to the present exemplary embodiment, it is desirable that the first groove-like channels 1843 (the first liquid holding path 10) and the second groove-like channel 1844 (the second liquid holding path 20) be each formed so that a portion closer to the lid member 180 have a stronger capillary force. More specifically, the second groove-like channel 1844 (the second liquid holding path 20) is formed to have a stronger capillary force than the first groove-like channels 1843 (the first liquid holding path 10). More specifically, the width (the length in the Z direction) of the second groove-like channel 1844 (the second liquid holding path 20) is made smaller than the width (the length in the Y direction) of each of the first groove-like channels 1843 (the first liquid holding path 10). The depth of each of the first groove-like channels 1843 (the first liquid holding path 10) and the depth of the second groove-like channel 1844 (the second liquid holding path 20) are constant. In this way, the liquid 200 that has oozed from the first surface 170*a* of the liquid absorber 170 can be reliably held by the whole of the first groove-like channels 1843 (the first liquid holding path 10) and the second groove-like channel 1844 (the second liquid holding path 20). As in the first exemplary embodiment, the first groove-like channels 1843 (the first liquid holding path 10) can each be formed so that a portion closer to the lid member 180 has a stronger capillary force. It is also desirable that the widths of each of the first groove-like channels 1843 (the first liquid holding path 10) and the second groove-like channel 1844 (the second liquid holding path 20) be always greater than the depths thereof.

The second groove-like channel 1844 (the second liquid holding path 20) can be formed to cross the first groove-like channels 1843 (the first liquid holding path 10). More specifically, the second groove-like channel 1844 (the second liquid holding path 20) connects portions, other than end portions, of the first groove-like channels 1843 (the first liquid holding path 10). With this structure, too, the liquid 200 that has oozed from the first surface 170*a* of the liquid absorber 170 can be reliably held.

In the above case, too, it is desirable that the first groove-like channels 1843 (the first liquid holding path 10) and the second groove-like channel 1844 (the second liquid holding path 20) be each formed so that a portion closer to the lid member 180 has a stronger capillary force. More specifically, the capillary force generated at a portion of each of the first groove-like channels 1843 (the first liquid holding path 10) that is closer to the corresponding contact surface 184*a* than the second groove-like channel 1844 (the second liquid holding path 20) is defined as $F1$. The capillary force generated at a portion of each of the first groove-like channels 1843 (the first liquid holding path 10) that is closer to the lid member 180 than the second groove-like channel 1844 (the second liquid holding path 20) is defined as $F2$. The capillary force generated at the second groove-like channel 1844 (the second liquid holding path 20) is defined as $F3$. It is desirable that the first groove-like channels 1843 (the first liquid holding path 10) and the second groove-like channel 1844 (the second liquid holding path 20) satisfy a relationship of $F1<F3<F2$. In this way, the liquid 200 that has oozed from the first surface 170*a* of the liquid absorber 170 can be reliably held by the whole of the first groove-like channels 1843 (the first liquid holding path 10) and the second groove-like channel 1844 (the second liquid holding path 20).

The relationship of $F1<F3<F2$ described above can be achieved by changing the widths or wettabilities of each of the first groove-like channels 1843 (the first liquid holding path 10) and the second groove-like channel 1844 (the second liquid holding path 20) depending on the portion.

For example, assuming that the width of a portion at which the capillary force F1 is generated is w11, the width of a portion at which the capillary force F2 is generated is w12, and the width of a portion at which the capillary force F3 is generated is w13, when a relationship of w11>w13>w12 is satisfied, the relationship of F1<F3<F2 can be achieved. In this case, too, it is desirable that the widths of each of the first groove-like channels 1843 and the second groove-like channel 1844 be always greater than the depths at each portion. While the depth of each of the first groove-like channels 1843 (the first liquid holding path 10) and the depth of the second groove-like channel 1844 (the second liquid holding path 20) are the same as each other, the present exemplary embodiment is not limited thereto. The depths can be appropriately changed depending on the channel width or the capillary force.

In addition, the second groove-like channel 1844 (the second liquid holding path 20) can be provided in plurality in parallel with each other. In this way, more liquid can be held by the first groove-like channels 1843 (the first liquid holding path 10) and the second groove-like channels 1844 (the second liquid holding path 20).

In the present exemplary embodiment, the first groove-like channels 1843 (the first liquid holding path 10) and the second groove-like channel 1844 (the second liquid holding path 20) are provided on the first side surface 184A-1 of each rib 184A, but the surface on which these groove-like channels are arranged is not limited to the first side surface 184A-1. The first groove-like channels 1843 (the first liquid holding path 10) and the second groove-like channel 1844 (the second liquid holding path 20) can be provided on both the first side surface 184A-1 and the second side surface 184-2 of each rib 184A. In this way, more liquid can be held by the first groove-like channels 1843 (the first liquid holding paths 10) and the second groove-like channels 1844 (the second liquid holding paths 20), and a liquid leakage from the air communication port 181 can be prevented more reliably.

Further, while the first groove-like channels 1843 (the first liquid holding path 10) and the second groove-like channel 1844 (the second liquid holding path 20) are provided on the ribs 184A adjacent to the projection portion 185, the first groove-like channels 1843 (the first liquid holding path 10) and the second groove-like channel 1844 (the second liquid holding path 20) can be arranged on the other ribs 184. In addition to the ribs 184A, the first groove-like channels 1843 (the first liquid holding path 10) and the second groove-like channel 1844 (the second liquid holding path 20) can be formed on the other ribs 184 as appropriate. In this way, a liquid leakage from the air communication port 181 can be prevented more reliably.

The first to third exemplary embodiments described above are examples of exemplary embodiments of the present disclosure, and the configurations described in the first to third exemplary embodiments can be changed as appropriate. For example, the groove-like channels 1841, 1843, and 1844, and the slit-like channels 1842 can be appropriately combined as long as a liquid can be held by capillary action. This can improve the degree of freedom in design while preventing a liquid from entering the air communication port 181.

For example, in the third exemplary embodiment described above, the first groove-like channels 1843, which serve as the first liquid holding path 10, can be replaced by the slit-like channels 1842 illustrated in FIGS. 7A to 7C. In this case, the second groove-like channel 1844, which serves as the second liquid holding path 20, can be provided on one or each of the first side surfaces 184A-1 and the second side surface 184A-2. The second groove-like channel 1844 is formed to hold the liquid flowing from the slit-like channels 1842. In this way, more liquid can be held.

Further, in the third exemplary embodiment, the second groove-like channel 1844, which serves as the second liquid holding path 20, can be replaced by the slit-like channels 1842 illustrated in FIGS. 7A to 7C. In other words, the slit-like channels 1842 can be provided as the second liquid holding path 20. The slit-like channels 1842 are formed to hold the liquid flowing from the first groove-like channels 1843. In this way, more liquid can be held.

To increase the amount of liquid that can be held, the shape of the first liquid holding path 10 can be changed as appropriate.

Figure 9:
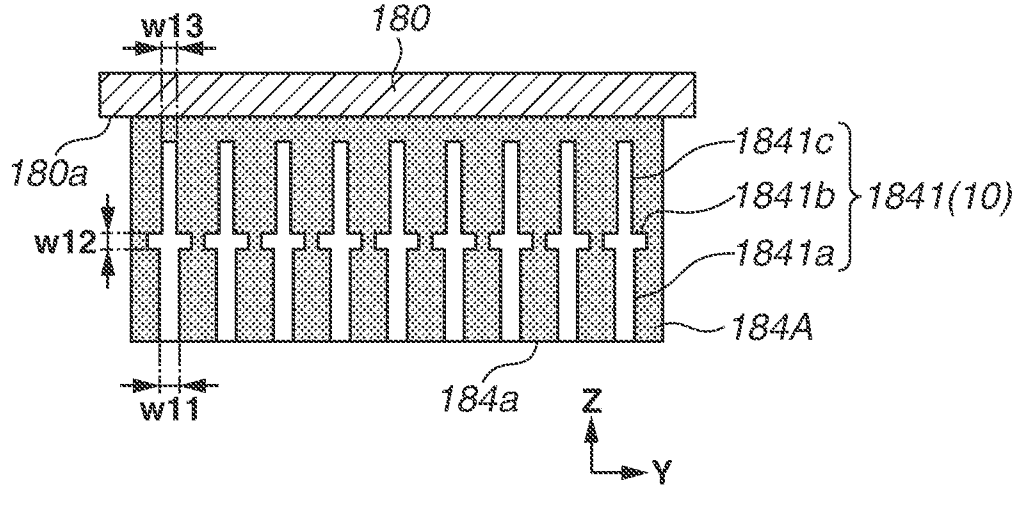
FIG. 9 is a schematic view illustrating a variation of the ribs of the lid member illustrated in FIGS. 4A to 4D.

FIG. 9 schematically illustrates a variation of the ribs 184 of the lid member 180 illustrated in FIGS. 4A to 4D. This variation includes the groove-like channels 1841 each formed by a first groove-like channel 1841*a*, a second groove-like channel 1841*b*, and a third groove-like channel 1841*c* as the first liquid holding path 10.

The first groove-like channel 1841*a* has one end open to the contact surface 184*a* of the corresponding rib 184A, and extends toward the lid member 180 (extends in a Z direction). The second groove-like channel 1841*b* is coupled to the other end of the first groove-like channel 1841*a* and extends in a direction (a Y direction) that crosses the first groove-like channel 1841*a*. The third groove-like channel 1841*c* has one end coupled to the second groove-like channel 1841*b*, and extends toward the lid member 180 (extends in the Z direction). The liquid 200 that has oozed from the first surface 170*a* of the liquid absorber 170 can be held by the whole of the first groove-like channel 1841*a*, the second groove-like channel 1841*b*, and the third groove-like channel 1841*c*. The width of the second groove-like channel 1841*b* is greater than each of the width of the first groove-like channel 1841*a* and the width of the third groove-like channel 1841*c*. This structure can hold more liquid than the structure illustrated in FIGS. 4A to 4D.

According to this variation, it is desirable that the other end of the third groove-like channel 1841*c* not reach the inner surface 180*a* of the lid member 180. In other words, it is desirable that the other end of the third groove-like channel 1841*c* terminate between the inner surface 180*a* of the lid member 180 and the second groove-like channel 1841*b*. In this way, the liquid held in the third groove-like channel 1841*c* can be prevented from moving to the inner surface 180*a* of the lid member 180.

In addition, assuming that the first groove-like channel 1841*a*, the second groove-like channel 1841*b*, and the third groove-like channel 1841*c* have capillary forces F1, F2, and F3, respectively, it is desirable that a relationship of F1<F2<F3 be satisfied. In this way, the liquid 200 can be reliably held by the whole of the first groove-like channel 1841*a*, the second groove-like channel 1841*b*, and the third groove-like channel 1841*c*.

The relationship of F1<F2<F3 described above can be achieved by changing the widths or the wettabilities of the first groove-like channel 1841*a*, the second groove-like channel 1841*b*, and the third groove-like channel 1841*c*. For example, assume that the width of the first groove-like channel 1841*a* is w11, the width of the second groove-like channel 1841*b* is w12, and the width of the third groove-like channel 1841*c* is w13. The width w11 and the width w13 are lengths in the Y direction, and the width w12 is a length in the Z direction. In this case, by satisfying a relationship of w11>w12>w13, the relationship of F1<F2<F3 can be achieved. It is desirable that the widths of the first groove-like channel 1841*a*, the second groove-like channel 1841*b*, and the third groove-like channel 1841*c* be always greater than the depths thereof. While the first groove-like channel 1841*a*, the second groove-like channel 1841*b*, and the third groove-like channel 1841*c* have the same depth, the present variation is not limited thereto. The channel depth can be appropriately changed depending on the channel width and the capillary force.

The second groove-like channel 1841*b* can be provided in plurality for each of the groove-like channels 1841. In this way, more liquid can be held by each of the groove-like channels 1841.

The present variation is applicable to any of the second and third exemplary embodiments.

For example, in the second exemplary embodiment, the second groove-like channel 1841*b* is provided on one or each of the first side surface 184A-1 and the second side surface 184A-2 of each rib 184A. In this case, the second groove-like channel 1841*b* is formed to hold the liquid flowing from each of the slit-like channels 1842. In this way, more liquid can be held.

According to the exemplary embodiments of the present disclosure, even when the amount of injected liquid increases, the liquid is prevented from leaking to the outside from an air communication port.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-078966, filed May 12, 2022, which is hereby incorporated by reference herein in its entirety.

What is claimed is:

1. A liquid storage container comprising:
- a liquid absorber configured to absorb and hold a liquid;
- a storage portion storing the liquid absorber, and having an opening portion facing a first surface of the liquid absorber;
- a lid member configured to cover the opening portion of the storage portion;
- a plurality of ribs provided on an inner surface of the lid member that is located closer to the storage portion, wherein the plurality of ribs is in contact with the first surface of the liquid absorber in a state where the opening portion is covered by the lid member;
- an air communication port provided in the lid member so that an internal space of the storage portion communicates with air; and
- at least one first liquid holding path provided on at least one rib adjacent to the air communication port among the plurality of ribs, and extending toward the lid member from a contact surface of the at least one rib that is in contact with the first surface,
- wherein the at least one first liquid holding path is configured to hold a liquid that has oozed from the first surface of the liquid absorber.

2. The liquid storage container according to claim 1, wherein the at least one first liquid holding path is configured so that a channel width of the at least one first liquid holding path is greater than a channel depth of the at least one first liquid holding path.

3. The liquid storage container according to claim 1, wherein the at least one first liquid holding path has a capillary force that is stronger at a portion closer to the lid member.

4. The liquid storage container according to claim 3, wherein the at least one first liquid holding path has a width that is narrower at a portion closer to the lid member.

5. The liquid storage container according to claim 1, wherein a second end of the at least one first liquid holding path terminates between the inner surface of the lid member and the contact surface of the at least one rib.

6. The liquid storage container according to claim 1, wherein the at least one first liquid holding path is a groove-like channel provided on a side surface of the at least one rib, and a first end of the groove-like channel is open to the contact surface of the at least one rib.

7. The liquid storage container according to claim 6,
- wherein the at least one rib has a first side surface on a side closer to the air communication port, and a second side surface on a side opposite to the first side surface, and
- wherein the groove-like channel is provided at least on the first side surface.

8. The liquid storage container according to claim 6,
- wherein the groove-like channel includes:
- a first groove-like channel having a first end open to the contact surface of the at least one rib, and extending toward the lid member,
- a second groove-like channel coupled to a second end of the first groove-like channel, and extending in a direction that crosses the first groove-like channel, and
- a third groove-like channel having a first end coupled to the second groove-like channel, and extending toward the lid member, and
- wherein the first groove-like channel, the second groove-like channel, and the third groove-like channel are each configured to hold a liquid.

9. The liquid storage container according to claim 8, wherein, assuming that the first groove-like channel, the second groove-like channel, and the third groove-like channel have capital forces F1, F2, and F3, respectively, a relationship of F1<F2<F3 is satisfied.

10. The liquid storage container according to claim 1, wherein the at least one first liquid holding path is a slit-like channel penetrating the at least one rib in a thickness direction of the at least one rib, and a first end of the slit-like channel is open to the contact surface of the at least one rib.

11. The liquid storage container according to claim 1, wherein the at least one first liquid holding path is provided in plurality in parallel with each other.

12. The liquid storage container according to claim 1, further comprising at least one second liquid holding path provided on the at least one rib, communicating with the at least one first liquid holding path, and extending in a direction that crosses the at least one first liquid holding path,
- wherein the at least one second liquid holding path is configured to hold a liquid flowing from the at least one first liquid holding path.

13. The liquid storage container according to claim 12, wherein an end portion of the at least one first liquid holding path that is closer to the lid member is coupled to the at least one second liquid holding path.

14. The liquid storage container according to claim 13, the at least one second liquid holding path is stronger in capillary force than the at least one first liquid holding path.

15. The liquid storage container according to claim 14, wherein the at least one second liquid holding path is narrower in width than the at least one first liquid holding path.

16. The liquid storage container according to claim 12, wherein the at least one second liquid holding path is a groove-like channel provided on a side surface of the at least one rib.

17. The liquid storage container according to claim 1, further comprising at least one second liquid holding path provided on the at least one rib, communicating with the at least one first liquid holding path, and extending in a direction that crosses the at least one first liquid holding path, wherein the at least one first liquid holding path is a first groove-like channel provided on a side surface of the at least one rib, wherein the at least one second liquid holding path is a second groove-like channel provided on the side surface of the at least one rib, and wherein the first groove-like channel has a first end open to the contact surface of the at least one rib, and a second end coupled to the second groove-like channel.

18. The liquid storage container according to claim 1, further comprising at least one second liquid holding path provided on the at least one rib, communicating with the at least one first liquid holding path, and extending in a direction that crosses the at least one first liquid holding path, wherein the at least one first liquid holding path is a slit-like channel penetrating the at least one rib in a thickness direction of the at least one rib, wherein the at least one second liquid holding path is a groove-like channel provided on a side surface of the at least one rib, and wherein the slit-like channel has a first end open to the contact surface of the at least one rib, and a second end coupled to the groove-like channel.

19. The liquid storage container according to claim 1, further comprising at least one second liquid holding path provided on the at least one rib, communicating with the at least one first liquid holding path, and extending in a direction that crosses the at least one first liquid holding path, wherein the at least one first liquid holding path is a groove-like channel provided on a side surface of the at least one rib, wherein the at least one second liquid holding path is a slit-like channel penetrating the at least one rib in a thickness direction of the at least one rib, and wherein the groove-like channel has a first end open to the contact surface of the at least one rib, and a second end coupled to the slit-like channel.

20. A liquid storage container comprising:

a liquid absorber configured to absorb and hold a liquid;

a storage portion storing the liquid absorber, and having an opening portion facing a first surface of the liquid absorber;

a lid member configured to cover the opening portion of the storage portion;

a plurality of ribs provided on an inner surface of the lid member that is located closer to the storage portion, wherein the plurality of ribs is in contact with the first surface of the liquid absorber in a state where the opening portion is covered by the lid member; and an air communication port provided in the lid member so that an internal space of the storage portion communicates with air, wherein at least one rib adjacent to the air communication port among the plurality of ribs has a capillary structure configured to absorb a liquid that has oozed from the first surface of the liquid absorber.

* * * * *